(No Model.) 4 Sheets—Sheet 1.
P. B. DELANY.
AUTOMATIC TELEGRAPHY.
No. 395,427. Patented Jan. 1, 1889.
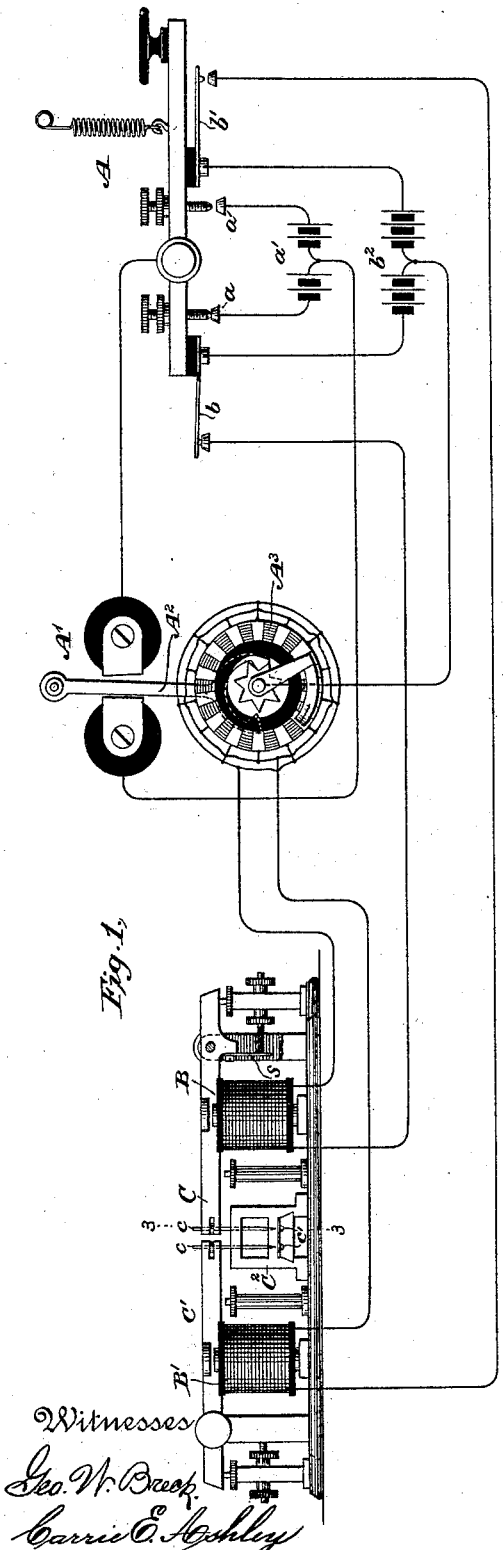
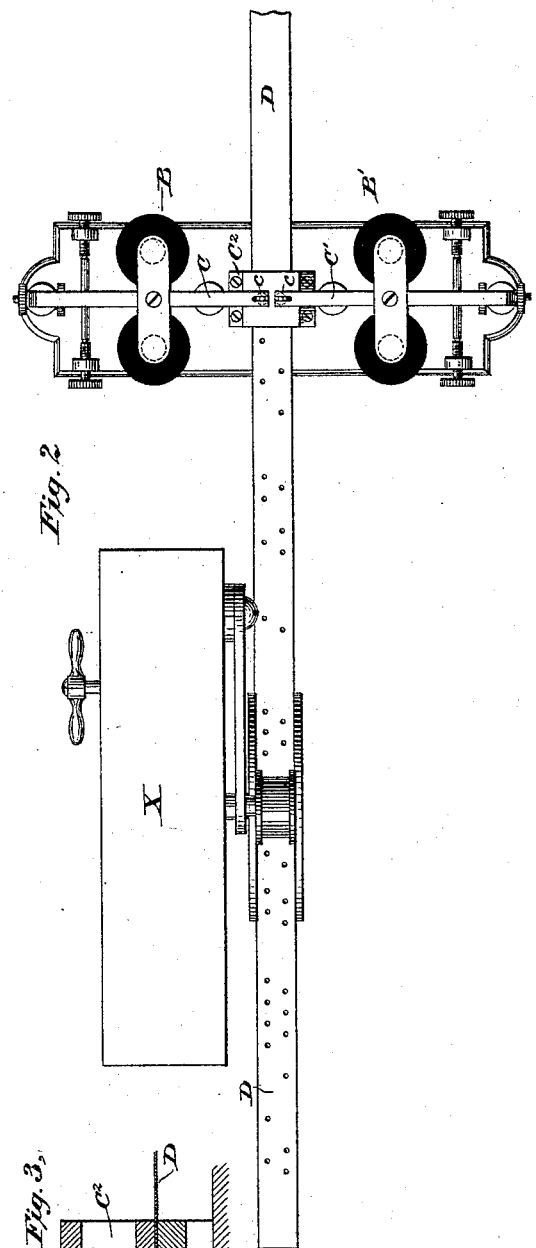

(No Model.) 4 Sheets—Sheet 2.
P. B. DELANY.
AUTOMATIC TELEGRAPHY.
No. 395,427. Patented Jan. 1, 1889.
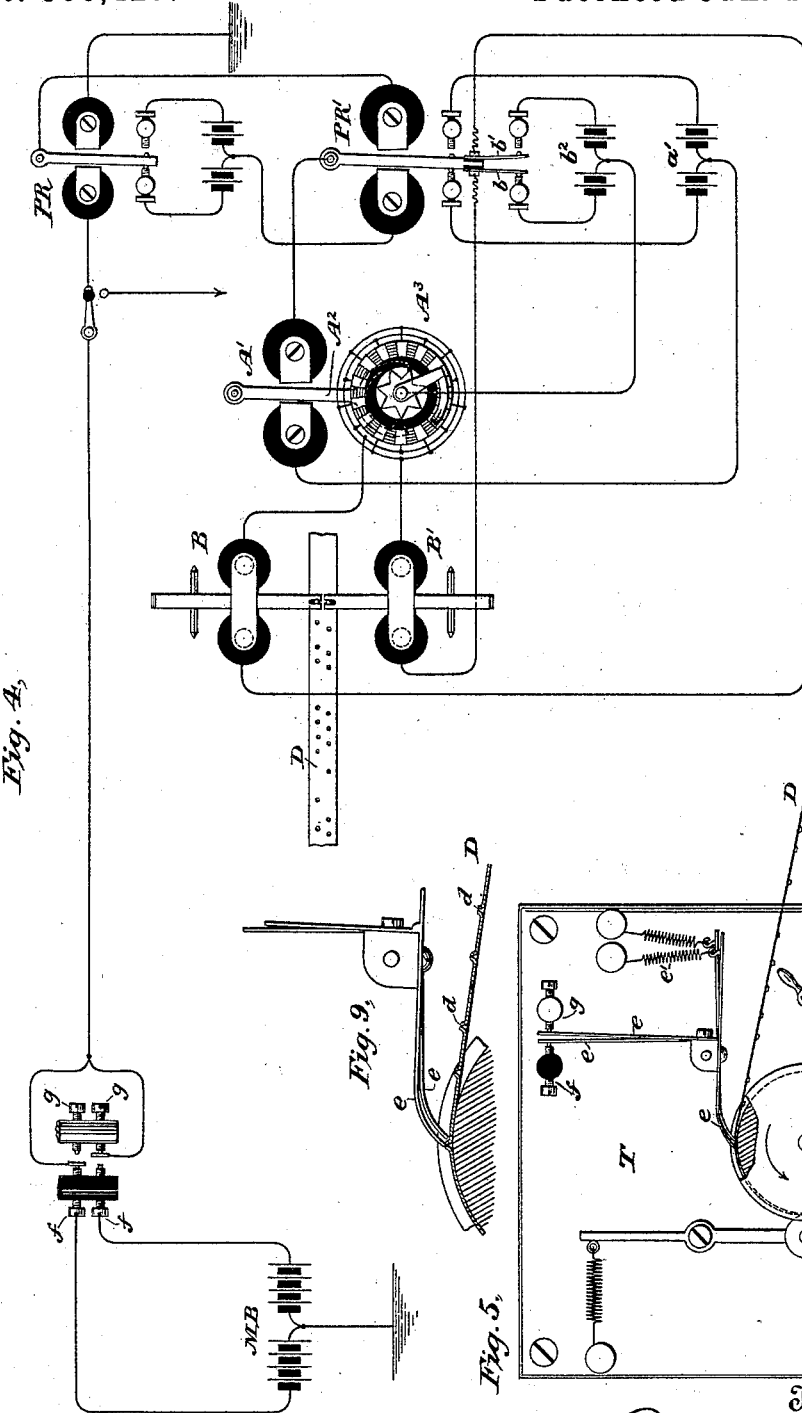

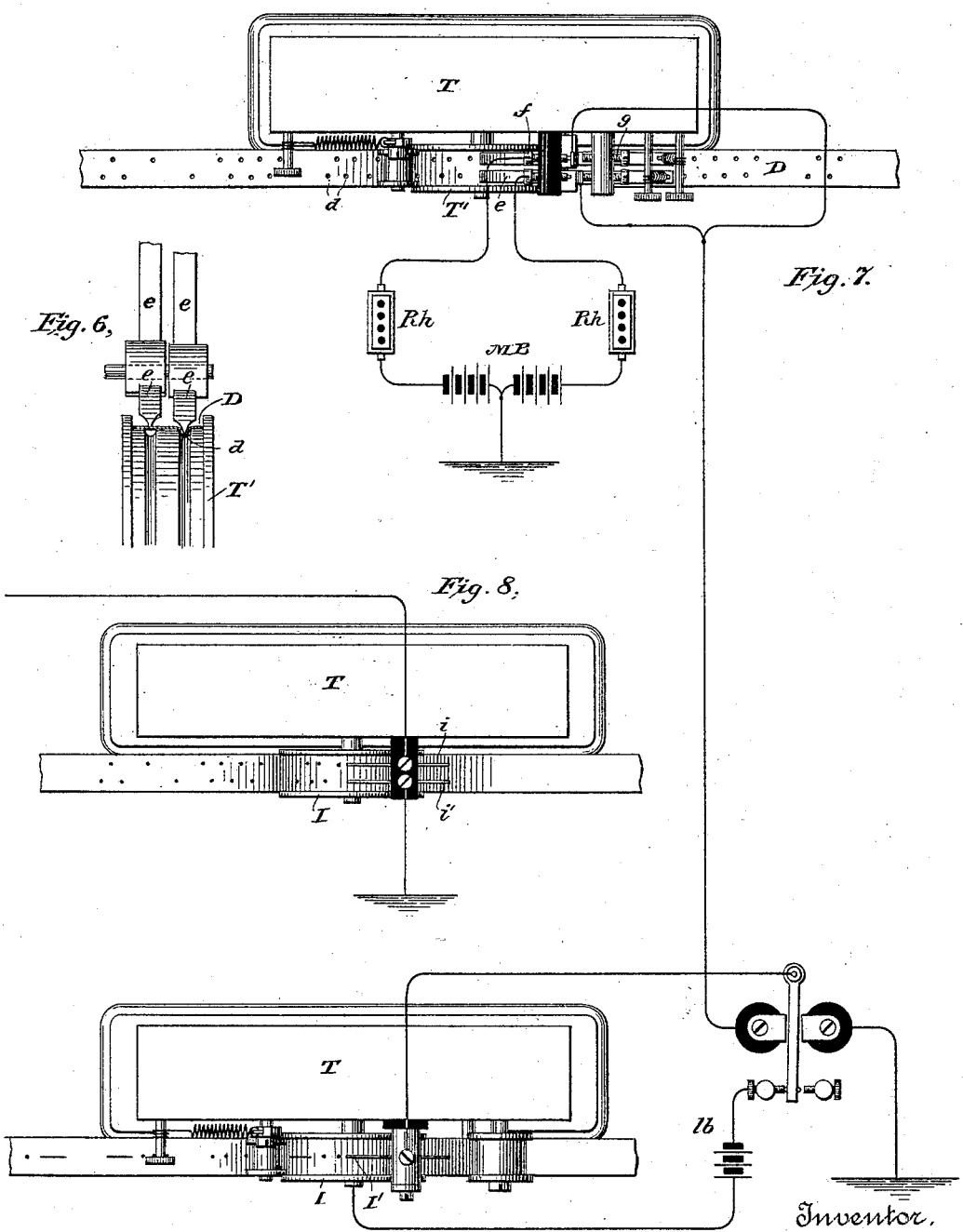

(No Model.)  4 Sheets—Sheet 4.

P. B. DELANY.
AUTOMATIC TELEGRAPHY.

No. 395,427.  Patented Jan. 1, 1889.

Witnesses.
Geo. W. Breck.
Carrie E. Ashley.

Inventor.
Patrick B. Delany
By his Attorneys
Baldwin & Davidson

UNITED STATES PATENT OFFICE.

PATRICK B. DELANY, OF NEW YORK, N. Y.

AUTOMATIC TELEGRAPHY.

SPECIFICATION forming part of Letters Patent No. 395,427, dated January 1, 1889.

Application filed February 20, 1888. Serial No. 264,681. (No model.)

*To all whom it may concern:*

Be it known that I, PATRICK B. DELANY, a citizen of the United States, residing in New York city, in the State of New York, have invented certain new and useful Improvements in Automatic Telegraphy, of which the following is a specification.

My invention belongs to that class of automatic telegraphs in which the message to be transmitted is recorded or produced first upon a ribbon of paper or other suitable material, and is then automatically transmitted over the line.

The invention relates, among other things, primarily to the manner of recording or producing the messages on the ribbon and to the mechanism therefor, and to an organization whereby, upon the manipulation of a key in the ordinary way to transmit Morse signals, a paper or other ribbon or fillet may have messages recorded thereon by uniform puncturings or characters arranged in two rows according to the well-known Wheatstone system.

The invention further contemplates certain new organizations and operations whereby the transmission, reception, reading, &c., are improved.

All the features of my improvements will be more fully understood upon a consideration of the following specification and drawings, which describe and show one manner of carrying out the invention. The structures and organizations therein shown and described constitute a practical embodiment of my invention; but the invention is in many respects not necessarily limited to such details or specific organizations.

Figure 10:
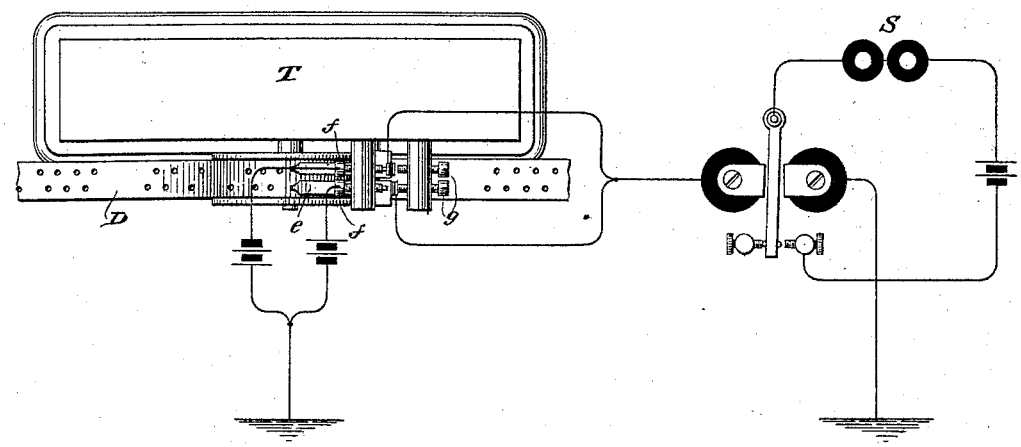
Figure 11:
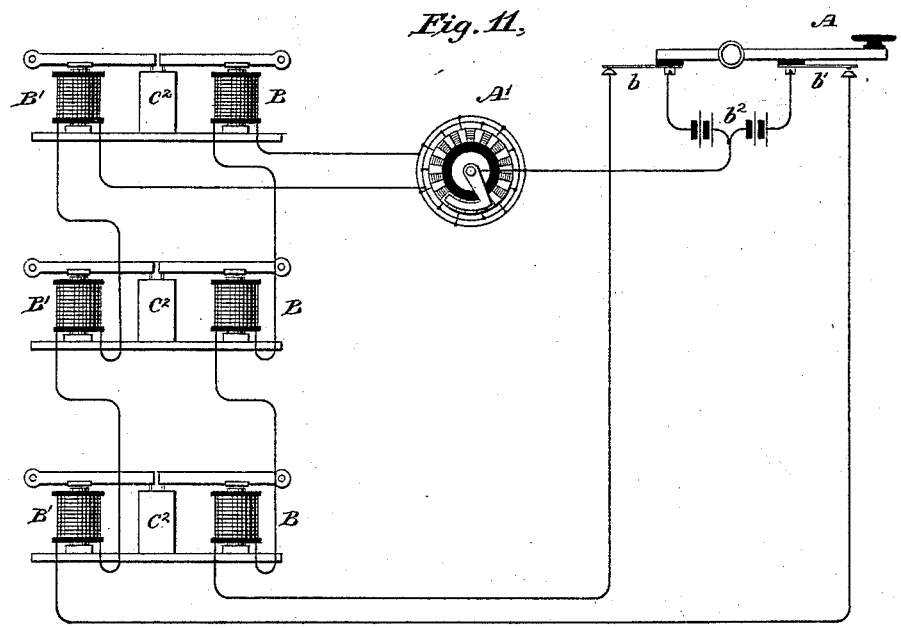

In the accompanying drawings, Figure 1 is a view in diagram and elevation showing an organization by which the messages or matter to be transmitted may be recorded upon the ribbon. Fig. 2 is a plan of a portion of the same, and also showing the ribbon drawing or feeding device. Fig. 3 is a detail sectional view on the line 3 3 of Fig. 1; Fig. 4, a diagrammatic view showing an arrangement for transmission and reception; Fig. 5, an elevation of one form of transmitter; and Fig. 6, a detail view of same, showing a ribbon with a message recorded thereon being passed under the transmitting-fingers when sending in the preferred manner; Fig. 7, a diagrammatic view showing reception through a relay on a chemical receiver; Fig. 8, a similar view showing chemical reception without a relay; Fig. 9, a detail view showing a different manner of using the ribbon for transmission. Fig. 10 is a diagram view showing a ribbon which has had the received message recorded thereon being passed through a local reading-sounder, and Fig. 11 is a diagram view illustrating the working of a number of recording or puncturing instruments from a single key or lever.

First, as to the improved manner of recording upon the ribbon the matter to be transmitted and in some cases the matter received.

Heretofore, as I am well aware, ribbons have been perforated in numerous ways in one, two, or more lines. By the term "perforated" herein used I mean to describe that result obtained by cutting out small disks or pieces from the ribbon, so as to leave apertures therein with both sides of the paper smooth, as is done when punches and dies are employed, as usual in automatic telegraphy. I am also well aware that ribbons of paper and other material have been prepared for transmission by embossing or indenting the characters therein; but in preparing the ribbon or recording the message thereon according to my present plan it is punctured instead of being perforated or embossed. When the ribbon is thus prepared, each aperture presents on one side a clean opening and on the other a burr or projection, and I may utilize either the one side or the other for transmission. The puncturing of the ribbon, which is effected by merely forcing through it a sharp-pointed instrument of the desired cross-section or diameter, may be accomplished in any suitable way, and any one familiar with the numerous well-known forms of perforating and embossing apparatus may readily adapt them to such a purpose. The organization or arrangement which I prefer to employ is that illustrated in Figs. 1, 2, and 3. In it the puncturing devices are operated by electro-magnets controlled by the manipulation of a Morse key. The ribbon, as seen in Fig. 2, is punctured in two rows. This is somewhat like the well-known Wheatstone manner of arranging the perforations, and, as in the Wheatstone system, transmission is effected by currents of alternating polarity and equal duration. Referring to Fig. 2, for instance, let the lower line of puncturings represent the transmission of positive currents and the upper line the transmission of negative currents. Polarized receiving devices being employed, each signal is commenced by a + current and terminated by a − current, and the interval elapsing between the two determines whether a dot or dash is transmitted. As shown in Fig. 2, a + current would first be transmitted and quickly followed by a − current, thus forming a dot. The second + current is, however, followed at a longer interval by the − current, and a dash is thus transmitted. The interval between + and − currents also represents a space. Obviously the matter may be read from such a strip as ordinary printed dots and dashes are, because the inclination and length of a line drawn from a lower hole to the corresponding upper one determines whether the two represent a dot or a dash.

So far as I am aware, I am the first to prepare a ribbon for transmission in the manner indicated. The resulting advantages are numerous and relate to the preparation of the ribbon, and also to its use for transmission. As to its preparation, the holes may be punctured by a sharp or needle pointed instrument, which deteriorates very slightly, if at all, in use, and as it requires but little power it may be operated by an electro-magnet having a small battery in circuit, and that is the way in which I prefer to actuate it. As to transmission, the smooth side may be placed next to the pivoted transmitting-fingers and the currents sent when the fingers drop into the apertures; or the burrs may be next to the fingers and currents be transmitted when the fingers are lifted by the burrs.

Referring now to Figs. 1, 2, and 3, which show a means for puncturing the strip, A is an ordinary key capable of being manipulated according to the Morse code or any other code in which the signals are made up of dots, dashes, and spaces. It is provided with front and back contacts, $a\ a$, through which the circuit of a split battery, $a'$, containing the coils of a polarized relay, $A'$, is completed alternately from opposite poles as the key is depressed and raised. The armature $A^2$ of the relay is provided with pallets, which engage the teeth of a star-wheel on a spindle carrying a radial arm having a trailer, which is thus caused to travel around a circle of insulated segments, $A^3$, as the armature-lever moves in response to the manipulations of the key. The key has also yielding back and front contact arms, $b\ b'$, each connected with a pole of a split battery, $b^2$, having its middle connected with the trailer on the table of contacts $A^3$. The stops against which the yielding arms $b\ b'$ work are respectively connected through coils of a magnet, B or $B'$, with the alternate segments on the table $A^3$. If the key A be depressed, the circuit of the magnet $B'$ will be completed through the contact-arm $b'$ and segment on which the trailer then rests before the completion of the circuit of the polarized relay $A'$ through the front contact, $a$, and consequently before the armature $A^2$ has moved the trailer onto the next segment, which is connected in the circuit of the other magnet, B. In like manner on the raising of the key the circuit of the magnet B will be completed before the trailer is moved. Ample time is thus afforded for the charge of the magnets B B', each of which is always energized for practically a uniform fixed but brief period of time irrespective of how long the key is held down or up. Such an arrangement of key, circuits, segments, and trailer is shown and claimed in a pending application filed by me December 17, 1887, No. 258,178, and is not, therefore, herein claimed *per se*. The magnets B B' thus energized briefly but for uniform periods operate the devices which puncture or record the matter to be transmitted upon the ribbon or fillet.

In Letters Patent granted to me November 29, 1887, Nos. 373,967 and 373,968, the apparatus is for the same general purpose as that shown in my pending case above referred to.

Obviously the magnets B B' herein shown could be operated briefly and for uniform periods by causing their circuits to be completed during the passage of the trailer across a segment according to the manner of sending out impulses described in said patents; but the plan herein shown is preferred, for reasons unnecessary to recite. This part of my invention is not, therefore, limited to the particular organization shown, since other circuit changing and controlling devices interposed between the key and the puncturing or recording devices may be employed, and the above patents are cited as in part illustrating that fact.

So far as I am aware, I am the first to employ a key, to be manipulated according to the ordinary manner, in connection with the puncturing or recording devices and interposed circuit-controlling devices, so arranged that the recording devices are actuated for a definite period each time the key is depressed or raised and irrespective of the length of time during which it is maintained in either position; and, this being the case, it is obviously within my invention to have the magnets B or B' produce or control the recording of the message by other means than puncturing—all well known—and that whether done directly or indirectly.

The armature-lever C C' of each magnet B B' carries a needle or puncturer, $c$, which is more or less loosely connected with it and works more or less loosely in its socket in the block $C^2$, through which the paper or other ribbon, D, is drawn. The tension of the armature-levers may be adjusted by screws working against flat springs $s$, or otherwise.

In Fig. 3 is shown a section through the block C². Immediately beneath the puncturing or recording needle or rods is a depression to receive the point of the rod when it is forced down, and from the recess to the front of the block is a channel, $c'$, in which the burr or projection formed on the under side of the paper travels, so that it will not be crushed or broken down, and so that the ribbon may be pulled without hinderance. X in Fig. 2 represents any ordinary device for drawing the ribbon through the block C².

The construction and operation will be plain to any one skilled in the art. As the key is manipulated the matter is recorded on the paper in parallel lines—that is to say, by the depressions of the key the lower puncturings in Fig. 2 will be formed and by its elevations the upper line will be formed. As before remarked, the distance at which the upper aperture or recording-mark follows the lower one determines whether the record reads a dot or a dash. For instance, in Fig. 1 there is a dot followed by a dash, then a dash and three dots, then two dots, a space and a dot, and so on.

Where duplicate ribbons are required, two or more might be punctured at the same time by the same needles; or a gang of the instruments might be worked from a single key, the magnets B B' being either connected in multiple arc or in series, as indicated in the diagram, Fig. 11.

Regarding transmission, Figs. 4, 5, and 6 show an arrangement in which the impulses are transmitted when the pivoted fingers $e\ e$ fall into the apertures in the ribbon. T represents a transmitter having a grooved cylinder, T', to be rotated by a clock-movement or otherwise, over which the punctured ribbon is drawn under the fingers $e\ e$. The fingers are in line with the grooves in the cylinder in which the burrs $d$ on the paper run, Fig. 6, and their tension is adjusted by springs $e'$. Their vertical ends or extensions work between stops $f\ f$ and $g\ g$, with either of which opposite poles of the transmitting-battery M B may be connected. In Fig. 4 poles of the battery are shown respectively connected with the insulated stops $f\ f$, while both fingers $e$ are connected with the line, and this is the way in which I prefer to make the connections. As the punctured ribbon passes under the fingers, and when an aperture in one line of puncturings comes under a finger, it descends into it, thus drawing the upper part of the finger from its post $g$ against a battery-post, $f$, and a current of one polarity is transmitted, while when the other finger falls into an aperture in the other line an impulse of an opposite polarity is transmitted, thus terminating the signal on the polarized receiver P R and determining whether it be a dot or dash. The received message may be recorded in different ways. In Fig. 4 the record is made by puncturing a strip in correspondence with the transmitting-strip, and this is accomplished by causing the receiving-relay P R to work a second polarized relay, P R', whose armature corresponds with the key A, already described, and is equipped with similar contacts and works similar circuits and apparatus. A repetition of description is unnecessary; but in order that the operation may be perfectly clear all the parts are lettered to correspond with Fig. 1. This method of reception, in connection with another step new with me, is desirable and important. All messages received must be written out in ordinary characters, and yet few operators have the facility and training enabling them to read with ease a punctured strip. In my system, therefore, I record the received message at the highest speed attainable by puncturing the ribbon, and then give the ribbon to reading and transcribing operators, who pass it through local reading-sounders and reduce it to writing at such speed as they are capable. In this way messages received at a comparatively high speed can be read from an ordinary sounder at any speed suiting the particular operator, and I am enabled to employ for this purpose comparatively unskilled persons and let each one work up to his capacity.

In Fig. 10 is shown a punctured received strip being passed through a transmitter like that shown in Fig. 1 and operating a local polarized relay and sounder, S.

Instead of using the punctured ribbon, as above described, the burrs thereon can be made to lift the transmitting-fingers, as in Figs. 7 and 9, in which event the fingers are made wide at the ends, as indicated. In this figure opposite poles of the battery are connected with the insulated stops $f\ f$, against which the transmitting-fingers connected with the line normally bear. The two sections of the battery therefore balance each other and no battery goes to line; but when a burr $d$ passes under a finger, Fig. 9, its upright extension is lifted from its post $f$, and consequently an impulse from one section of the battery is sent into the line. The current thus transmitted enters the line through the stationary finger as soon as the other finger is lifted from its post $f$ and continues until said finger returns to its normal position against its post. When working thus I put resistances R $h$, of suitable capacity, between each battery or section of the battery and its post $f$, to prevent its running down or deteriorating during the time both transmitting-fingers are on their posts $f$. With such an arrangement the line is normally grounded through the batteries and static and other disturbances are eliminated from the circuit.

Of course I might connect the sections of the battery to the back posts, $g\ g$. In that event current would enter the line when the burrs on the ribbon lifted the transmitting-fingers against the posts $g\ g$ and would only continue during such contact. When thus working I would omit the resistances R $h$. In Fig. 7 the transmitted impulses are caused to work a polarized relay, the armature-lever of which opens and closes the circuit of a local battery, $l\,b$, in which is included the drum I and stylus I' of a chemical receiver, the alternating transmitted impulses appearing as Morse dots and dashes on the paper; or I may receive chemically direct, as shown in Fig. 8, in which event the main line is connected directly with one pin or stylus, $i$, and the other, $i'$, arranged alongside of it, but insulated therefrom, is connected to the earth. With this arrangement the positive impulses produce dots under the stylus $i$, and the negative impulses dots under the stylus $i'$, the received dots corresponding in position with the puncturings on the transmitting-strip, as seen from the drawings.

I claim as my invention—

1. The combination of a transmitter having a double-grooved surface over which the ribbon having lines of apertures coinciding with said grooves passes, pivoted transmitting-fingers having pointed ends under which the ribbon runs connected with the main line and each arranged opposite or in line with one of the said grooves, insulated battery-connected stops against which said fingers fall when their pointed ends enter apertures in the ribbon, and a source of electric energy having poles of unlike sign connected to said stops, substantially as and for the purpose set forth.

2. The combination, with ribbon drawing or feeding devices, of a block or holder through which the ribbon is drawn, duplicate puncturers arranged side by side and having sharp or needle points for piercing the ribbon, their actuating-magnets, and the circuits of said magnets, the Morse key, and actuating-magnet circuit-completing devices interposed between said magnets and the key.

3. The combination of the duplicate recording devices, their magnets B B', and the circuits of said magnets, the alternate segments in the table $A^3$ included in the circuits of said magnets, the trailer traversing said segments, the Morse key, and trailer-actuating devices interposed between the trailer and key, whereby the trailer is moved when the key is depressed and when it is raised, and said magnets alternately energized for brief periods irrespective of the time during which the key is held in either position.

4. The combination, substantially as set forth, of the duplicate recording devices, their magnets B B', a key capable of being manipulated according to the Morse or like codes, circuit-controlling devices interposed between the magnets and key, and consisting of contacts or segments and a trailer traversing them, trailer-actuating devices interposed between the key and trailer, and the circuit of the magnets B B', for the purpose described.

5. The block $C^2$, formed with a passage for the reception of the ribbon, the recess opposite the recording-rod, and the groove $c'$, substantially as set forth.

6. The combination, substantially as set forth, of two or more independent ribbon recorders, each having duplicate recording devices and actuating-magnets B B', the table of segments having alternate segments connected in circuit with the magnets B of the respective recorders, and the remaining segments connected in circuit with the magnets B' of the recorders, the trailer traversing said segments and connected in both said circuits, the Morse key, and trailer-actuating devices interposed between the trailer and key, whereby upon the manipulation of the key the same matter may be recorded upon several ribbons at the same time.

In testimony whereof I have hereunto subscribed my name.

PATRICK B. DELANY.

Witnesses:
GEORGE F. HARRIMAN,
LLOYD B. WIGHT.

It is hereby certified that in Letters Patent No. 395,427, granted January 1, 1889, upon the application of Patrick B. Delany, of New York, N. Y., for an improvement in "Automatic Telegraphy," an error appears in the printed specification requiring correction as follows: In lines 16–17, page 2, the sentence "The interval between + and — currents also represents a space," should read *The interval between — and + currents represents a space;* and that the said Letters Patent should be read with this correction therein that the same may conform to the record of the case in the Patent Office.

Signed, countersigned, and sealed this 19th day of February, A. D. 1889.

[SEAL.] 
D. L. HAWKINS,
*Assistant Secretary of the Interior.*

Countersigned:
BENTON J. HALL,
*Commissioner of Patents.*